United States Patent
Vronay et al.

(10) Patent No.: US 7,441,194 B2
(45) Date of Patent: Oct. 21, 2008

(54) CALENDAR-BASED USER INTERFACE SYSTEM

(75) Inventors: David P. Vronay, Bellevue, WA (US); Lili Cheng, Bellevue, WA (US); Sean U. Kelly, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 623 days.

(21) Appl. No.: 10/187,347

(22) Filed: Jun. 28, 2002

(65) Prior Publication Data

US 2003/0156138 A1 Aug. 21, 2003

(51) Int. Cl.
*G06F 3/00* (2006.01)

(52) U.S. Cl. .................. 715/738; 715/825; 715/853; 715/963

(58) Field of Classification Search ............... 715/825, 715/963, 738, 853
See application file for complete search history.

(56) References Cited

U.S. PATENT DOCUMENTS

| | | | |
|---|---|---|---|
| 5,220,657 A | 6/1993 | Bly et al. | |
| 5,428,784 A | 6/1995 | Cahill, Jr. | |
| 5,596,746 A | 1/1997 | Shen et al. | |
| 5,630,138 A | 5/1997 | Raman | |
| 5,634,062 A | 5/1997 | Shimizu et al. | |
| 5,694,594 A | 12/1997 | Chang | |
| 5,717,922 A | 2/1998 | Hohensee et al. | |
| 5,721,911 A | 2/1998 | Ha et al. | |
| 5,862,325 A | 1/1999 | Reed et al. | |
| 5,897,640 A | 4/1999 | Veghta et al. | |
| 5,970,490 A | 10/1999 | Morgenstern | |
| 6,189,019 B1 | 2/2001 | Blumer et al. | |
| 6,223,212 B1 | 4/2001 | Batty et al. | |
| 6,369,840 B1 * | 4/2002 | Barnett et al. | ............... 715/853 |
| 6,370,537 B1 | 4/2002 | Gilbert et al. | |
| 6,470,383 B1 | 10/2002 | Leshem et al. | |
| 6,473,752 B1 | 10/2002 | Fleming, III | |
| 6,480,830 B1 | 11/2002 | Ford et al. | |
| 6,487,556 B1 | 11/2002 | Downs et al. | |
| 6,493,637 B1 | 12/2002 | Steeg | |
| 6,549,221 B1 | 4/2003 | Brown et al. | |
| 6,704,739 B2 | 3/2004 | Craft et al. | |
| 6,725,240 B1 | 4/2004 | Asad et al. | |
| 6,731,927 B1 | 5/2004 | Stern et al. | |
| 6,775,659 B2 | 8/2004 | Clifton-Bligh | |
| 6,792,430 B1 | 9/2004 | Kenyon et al. | |
| 6,812,941 B1 | 11/2004 | Brown et al. | |

(Continued)

OTHER PUBLICATIONS

European Search Report, EP 03 00 2119, Mailed Nov. 2, 2004.

(Continued)

*Primary Examiner*—Michael Roswell
(74) *Attorney, Agent, or Firm*—Amin, Turocy & Calvin, LLP (57) ABSTRACT

A calendar-based interface system accommodates innate human memory by associating computer-related events, and other events, based upon when they occur. The calendar user interface system utilizes a calendar as a top-level user interface for accessing computer information. The calendar-based interface system utilizes system-wide monitoring of the user and associations between various computer files, people, and other information related to the user. This allows a user to view and assign searchable metadata (e.g., metadata relating to associated dates) and to retrieve computer information that matches selected metadata.

19 Claims, 8 Drawing Sheets

U.S. PATENT DOCUMENTS

| | | | |
|---|---|---|---|
| 6,842,878 | B1 | 1/2005 | Johnson et al. |
| 6,845,448 | B1 | 1/2005 | Chaganti et al. |
| 7,222,130 | B1* | 5/2007 | Cras et al. ............... 707/103 R |
| 7,334,196 | B2 | 2/2008 | Suppan et al. |
| 2002/0087579 | A1 | 7/2002 | Chasanoff et al. |
| 2002/0107859 | A1 | 8/2002 | Tsuyuki |
| 2002/0178436 | A1 | 11/2002 | Mastrianni et al. |
| 2003/0130995 | A1* | 7/2003 | Pope et al. ..................... 707/3 |
| 2003/0158855 | A1 | 8/2003 | Farnham et al. |
| 2003/0221122 | A1 | 11/2003 | Hatori |
| 2004/0205118 | A1 | 10/2004 | Yu |
| 2004/0254938 | A1 | 12/2004 | Marcjan et al. |
| 2004/0255301 | A1 | 12/2004 | Turski et al. |
| 2005/0006595 | A1 | 1/2005 | Goodwin et al. |

OTHER PUBLICATIONS

"Microsoft Outlook 97 Get Organized"; http://www.microsoft.com/office/previous/outlook/97brch/organized.asp; May 30, 2001, pp. 1-2.

M.A. Smith, et al.; "Visualization Components For Persistent Conversations"; Proceedings of the SIGCHI Conference on Human Factors in Computing Systems; 2001, pp. 136-143, vol. 3. No. 1, Seattle, Washington, United States.

Joe Tullio, et al., Augmenting Shared Personal Calendars, UIST'02, 2002, pp. 11-20, vol. 4—issue 2, Paris, France.

Elizabeth Mynatt, et al., Inferring Calendar Event Attendance, IUI'01, 2001, pp. 121-128, Santa Fe, New Mexico, USA.

Erik T. Mueller, A Calendar with Common Sense, IUI 2000, 2000, pp. 198-201, New Orleans, Louisiana, USA.

Fang, et al. "An experimental object-based sharing system for networked databases," The VLDB Journal, 1996, 15 pages, vol. 5—issue 2.

Yang, et al. A Configurable Approach for Object Sharing among Multidatabase Systems, CIKM'95, 1995, 7 pages, Baltimore, Maryland.

Souter, et al. "Contextual Def-Use Associations for Object Aggregation," PASTE'01, 2001, 7 pages, Snowbird, Utah.

Kashyap, et al. "Semantic and schematic similarities between database objects: a context-based approach," The VLDB Journal, 1996, 9 pages, vol. 5.

Foley. "Sapphire," Aims to Make Info Storage More Intuitive, http://www.microsoft-watch.com/article2/0,1995,1166890.asp, last accessed Apr. 18, 2003.

European Search Report dated Feb. 8, 2007 for European Patent Application Serial No. 04013743, 2 pages.

Chen, et al., "Automatic Construction of Networks of Concepts Characterizing Document Databases", Sep./Oct. 1992, IEEE, IEEE Transactions on Systems, Man, and Cybernetics, vol. 22 No. 5, pp. 885-902.

OA dated Jul. 2, 2008 for U.S. Appl. No. 10/461,119, 31 pages.

* cited by examiner

CALENDAR-BASED USER INTERFACE SYSTEM

TECHNICAL FIELD

The present invention relates to computer user interfaces and, in particular, to a calendar-based user interface that improves user accessibility of information from a computer.

BACKGROUND AND SUMMARY

When they were originally designed, personal computers were commonly used for just a relatively narrow range of applications. Computers, including portable and hand-held computing devices, are now used for a wide variety of applications and communication formats. As a result, computer users currently must organize much more information, as well as different types of information, than when computers were originally designed.

Conventional computer file systems force users to use and remember arbitrary, out-of-context filing structures, including file names, hierarchical directory structures, etc. In contrast, innate human memory works by association so that events are often remembered as happening in relationship to other events. With the significant numbers of computer files and computer information that many users interact with, conventional computer filing structures and organizations can make it difficult or impossible for users to find and access computer information they previously worked with or used.

Accordingly, the present invention provides a calendar-based interface system that accommodates innate human memory by associating computer-related events, and other events, based upon when they occur. The calendar user interface system utilizes a calendar as a top-level user interface for accessing computer information. The calendar-based interface system utilizes system-wide monitoring of the user and associations between various computer files, people, and other information related to the user. This allows a user to view and assign searchable metadata (e.g., metadata relating to associated dates) and to retrieve computer information that matches selected metadata.

Like printed calendars, conventional computer calendars typically require that most user-specific appointments, meetings, etc. be added or entered manually by users. In addition, many such calendars include events that are not relevant to many users, such as inapplicable holidays. The system of the present invention automatically associates and tracks time-related events, user computer activities, and information related to when the user works with documents, etc. on the computer.

In one implementation, a calendar-based interface system of this invention automatically integrates time-based information with metadata tagging to determine relationships between computer information (e.g., a family vacation may be associated with when vacation photos were taken and subsequently shared). The user can view an overview user interface calendar that includes various visualizations to provide a general overview of the user's activity over a time period. Alternatively, the user can view a context-specific calendar display in which time is used as a filter for a particular user context (e.g., a family vacation and items that relate to the vacation over time). The user context can be determined automatically, for example, by monitoring the user's computer activities and identifying from metadata associated with the computer activities what information is currently relevant to the user. The context-specific calendar display can further be used by the user to form a query for accessing relating information.

As a result, the calendar-based interface system of this invention utilizes a calendar as a dynamic application that does not require direct user input and can function as a tool for searching past events and computer information processed on the computer. This system provides a user interface that displays various types of information in the context of a calendar to provide users with event associations with which users can better locate and retrieve computer information.

Additional objects and advantages of the present invention will be apparent from the detailed description of the preferred embodiment thereof, which proceeds with reference to the accompanying drawings.

DETAILED DESCRIPTION OF PREFERRED EMBODIMENTS

Figure 1:
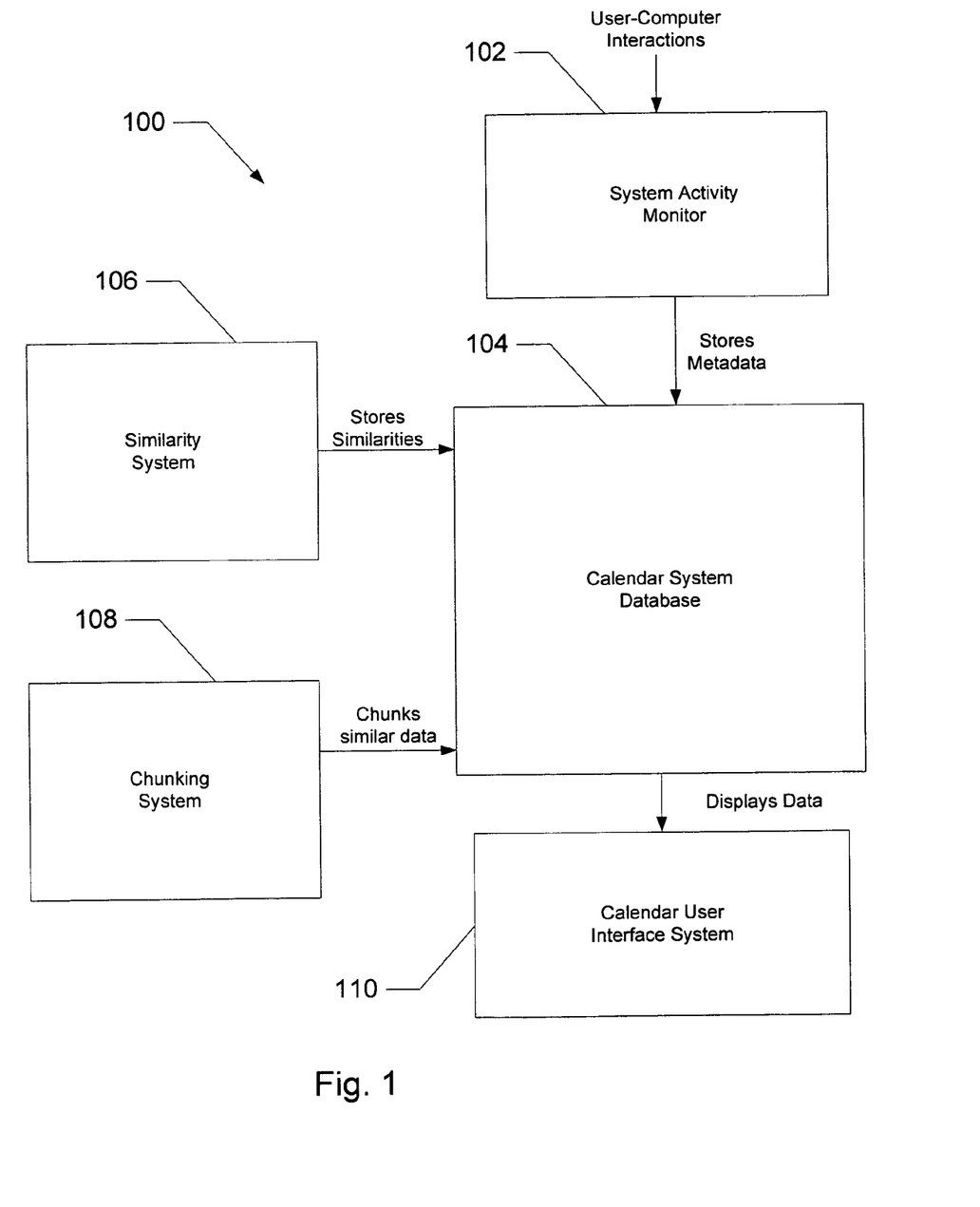
FIG. 1 is a functional block diagram of a calendar-based interface system that automatically determines associations between user computer activities and files, the associations including times when activities and actions with files occur.

FIG. 1 is a functional block diagram of a calendar-based interface system 100 that automatically determines associations between user computer activities, computer objects (e.g., files), and other events, the associations including times relating to the user computer activities, computer objects (e.g., files), and other events. The associations allow calendar-based interface system 100 to provide users with a calendar-based view of activities, events, and file actions and to use time as a filter for accessing such information.

The user computer activities may occur on a conventional desktop or laptop computer, or any other user-operated computing device such as a handheld computer, a digital cellular telephone, etc. For purposes of simplicity, these types of devices are referred to herein generally as computers. Calendar-based interface system 100 may be implemented as software that is stored on and executed by one or more such computers. Moreover, the components of calendar-based interface system 100 are exemplary of just one implementation. It will be appreciated that calendar-based user interfaces according to the present invention may be implemented with other implementations of calendar-based interface system 100.

Calendar-based interface system 100 includes a system activity monitor 102 that monitors user activity on a user-operated computer (not shown). System activity monitor 102 may be implemented as a computer program to which other applications, or the operating system, provide information of user computer activities, such as the opening of a document or other file. For each such activity, system activity monitor 102 creates or adds to a record of information (sometimes called "metadata") that is stored in a calendar system database 104. The metadata may be characterized as an annotation (or data) about other data or information on a computer, such as an annotation indicating the last time that a computer file was accessed.

In one implementation, system activity monitor 102 may include a universal input activity monitor that provides a single entry point for all user interactions with the computer, or at least specified user interactions with the computer. In this universal input implementation, system activity monitor 102 may determine and store as metadata in calendar system database 104 any or all of the following: input method data (e.g., text, speech, mouse, etc.), input language data (English, Chinese, etc.), input mode data (e.g., dictation or typed command), input assistance data (e.g., typed word completion, command guessing, etc.), input feedback data (e.g., whether the computer needs additional information, corrections of wrong guesses by the computer, etc.), etc. For instance, if a user copies or stores a picture in a web browser, system activity monitor 102 could store the network address (e.g., Uniform Resource Locator, URL) of the source page, as well as the URL of the image itself, as metadata in calendar system database 104.

Calendar system database 104 stores information (e.g., "metadata") about computer files stored on and activities carried out on a computer or computing device. The metadata may include conventional information, such as is conventional for computer-generated documents, including when the file was created, who created it, and a modification history. Also, some types of computer file types may have specific metadata fields that are not applicable to other file types. For instance, the metadata fields for a photo file type may include the size of the image, where the picture was taken, who took it, who is in it, etc. In one implementation, new metadata fields can be added to calendar database system 104 to accommodate new file types or to store new information about an existing file type.

Table 1A lists exemplary information that may obtained by system activity monitor 102 and stored in calendar system database 104. With regard to the various computer files and computer information (referred to collectively as objects) a computer user might interact with, system activity monitor 102 may collect data relating to any or all of the creator/author of the object, the type of the object, any pointer to the object (if available), activation events, object size, etc. For example, system activity monitor 102 may obtain the information about the objects with which a computer user interacts, determine whether the objects are new or unique relative to other objects listed in calendar system database 104 (e.g., based upon a unique object identifier), and aggregate or store the activities in calendar system database 104 in association with the unique object identifier of the object.

TABLE 1A

| | Data Collection and Analysis | |
| --- | --- | --- |
| | | Operationalization |
| Constructs | Data Collecting | Data Processing |
| | Objects Users Interact With | |
| General | creator/author of object, type of object, pointer to object if it still exists, activation events, object size | get information about objects, determine if new/unique & aggregate events at level of unique object ID |
| People | | |
| people in user's email people in user's contact list people users IM, Chat with Communications | email client aliases contact list files buddy list email aliases | |
| Emails | email events (open, close), email addresses | |
| phone messages | phone messages events (open, close), email alias | |
| instant messages | instant message (IM) session events (open, close), people | |
| chat messages Files | chat session events | |
| any file created, opened, saved, played, sent, etc. Web items | file names, place in directory | |
| web pages | URLs | |
| streaming items played | URLs | |
| Notifications | type of notification, response notification | |
| Applications | pointer to application | |

The objects with which the computer user interacts may be associated with other people, communications with other people, computer files, network or Web items, computer system notifications, and applications run on or accessible by the computer. System activity monitor 102 can obtain and store in calendar system database 104 each of the listed types of exemplary information.

Calendar-based interface system 100 includes a similarity or association system 106 that determines a degree of similarity or association between at least a pair of computer files or objects. Similarity or the degree of association may be represented, for example, as a numeric value between 0 and 1, where 1 would be identity between objects and 0 would indicate they are completely unrelated. Similarity system 106 may be implemented as one or more programs that, for a given target file and a collection of other files, return a similarity ranking between them.

It will be appreciated that different types of documents, files, or objects can have different types of similarity. For instance, two photos can look similar, could be taken at similar times, could be of a similar person, place, or event, could be the same color, could have been sent to the same people or printed together, could be parts of the same photo (e.g., one could have been cut from the other), etc. Table 1B lists exemplary associations or similarities that similarity system 106 may identify and store in calendar system database 104. As indicated, the associations or similarities may relate to objects or files having shared content, occurring at similar times or similar computer locations (e.g., computer, directory, etc.), being sent to or received from a common person, are be linked together.

TABLE 1B

Data Collected and Analysis

| Constructs | Data Collecting (Operationalization) | Data Processing |
|---|---|---|
| *Context: Associations between Objects* | | |
| Having shared content | cut/paste, event, insert event, objects saved as event, objects | |
| *Occurring near in time* | | |
| open on same machine at same time | open/close activation events, objects, date time of events | distance across times, overlapping sessions |
| *Occurring near in "place"* | | |
| on same machine | machine name | |
| near each other in directory | place in directory structure | min number of jumps through tree from one to the other |
| near each other in web | link event, links from, links to | STORE METADATA IN CALENDAR SYSTEM DATABASE |
| on the same email | attachment events, objects | aggregate at level of communication |
| *Being sent/received to one another* | | |
| item sent to another person pointer of item sent to another person | sent event, objects insert event, objects | |
| opened by a person saved by a person Activating one from within the other | open event, objects save event, objects | |
| items downloaded from a web page | dowload event, objects | |
| linked via a URL | link event, objects, link from, link to | |

In one implementation, similarity system 106 could be instructed to ignore certain types of similarity, or to weight one type of similarity more heavily than another. Moreover, the associations or similarities tracked and identified by similarity system could be extensible.

In addition, objects with which a user interacts can be of a different importance or significance to the user. For instance, a document that a user keeps open and edits of an extended period could be deemed top be of greater importance than a document that is opened for only a brief period of time. Likewise, a photo that is accessed and opened repeatedly could be deemed to be of greater importance that a photo that is only opened once. Table 1C lists exemplary factors by which similarity system 106, for example, could determine and store in calendar system database 104 the relative importance of objects. As indicated, the importance factors may relate to the duration of user interactions, the frequency of interactions, the recency of interactions, as well as the immediacy of user responses, the amount of copying, duplication, and backups, and the extent objects are shared.

TABLE 1C

Data Collection and Analysis

| Constructs | Data Collecting | Data Processing |
|---|---|---|
| | | Operationalization |
| | Importance of Objects | |
| Duration of interaction | open and close activation events, object | session times calculated by min max time/date, then summed by object |
| | keyboard events, mouse events, object | summed by object |
| Frequency of interaction | activation events, date/times | counts of unique activations/sessions |
| Recency of interaction | activation events, date/times | get maximum date |
| Immediacy of response to | | difference in time |
| Copying, duplication, backups | print, save as, multiple versions | |
| Sharing | show during meeting, share via email, etc. | |

A chunking system 108 uses the degrees of similarity or association determined by similarity or association system 106 for an arbitrarily large set of objects or files and groups or "chunks" them into a specified number of sub-groups. For instance, given 100 photos, chunking system 108 could separate them into any number of sub-groups or chunks based on one or more criteria such as the dates they were taken, or who is in the photos, for example. The criteria to be used by chunking system 108 may be pre-defined or specified by a user, for example, and in one implementation can place the same item into several chunks (e.g., a picture of Bob and Sue would go into a Bob chunk as well as a Sue chunk). Chunking system 108 may be implemented as one or more programs stored on the computer.

A calendar user interface system 110 utilizes information stored in calendar system database 104 by system activity monitor 102, as well as information determined by similarity or association system 106 and chunking system 108 to display different levels of time-based information relating the user computer activities and files. Accordingly, calendar-based interface system 100 accommodates innate human memory, which works by association so that events are often remembered as happening in relationship to other events. In contrast, conventional computer file systems force users to use and remember arbitrary, out-of-context filing structures. With the significant numbers of computer files and objects that many users interact with, conventional out-of-context filing structures can make it difficult, or impossible, for users to find and access computer information that was worked on or viewed in the past.

For example, a user may remember what she was working on the day of a memorable event (e.g., a meeting, a storm, an earthquake), but not the month or day of the event. As another example, a user may remember being very busy working on a presentation, but not who was invited to the presentation. Calendar-based interface system 100 provides a simple and fast way of automatically collecting time-based information, viewing the information, and searching the information, thereby providing access to computer-based information in a way that is much more compatible with how human memory actually works.

Accordingly, calendar-based interface system 100 allows a user to view and assign searchable metadata and to retrieve documents, objects or files that match selected metadata. Calendar user interface system 110 provides access to system-wide monitoring of the user and associations between various files, people, and other information related to the user and the context. In particular, calendar user interface system 110 utilizes a calendar as a top-level user interface for accessing computer information. It will be appreciated that calendar user interface system 110 would also provide and include standard calendar operations, such as being able to view months or days, temporal navigation, etc., similar to the calendar in numerous conventional calendar programs.

Figure 2:
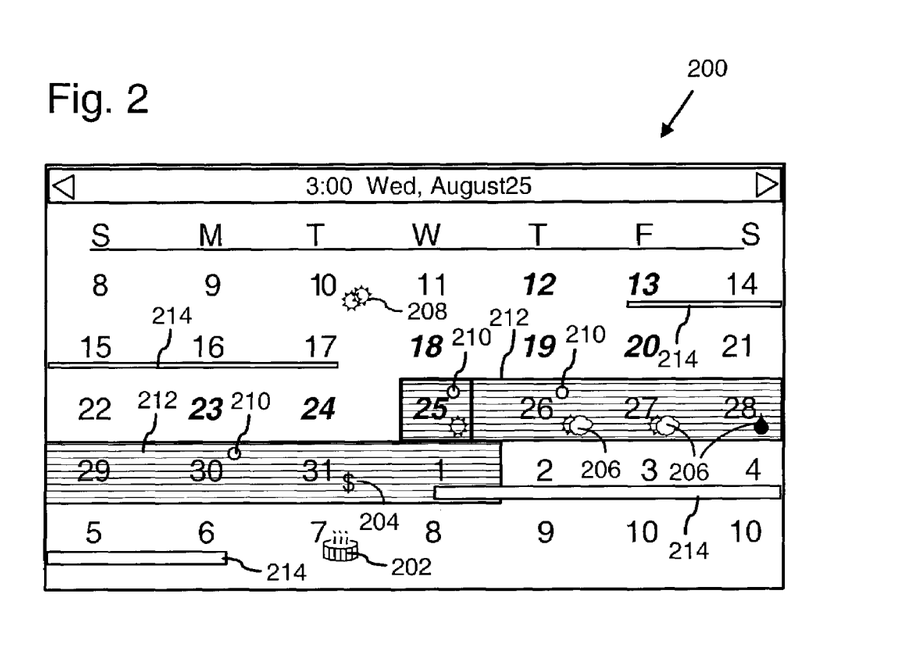
FIG. 2 is an illustration of an exemplary implementation of an overview calendar-based user interface rendered on a computer display screen.

FIG. 2 is an illustration of an exemplary implementation of an overview calendar-based user interface 200 rendered on a computer display screen by calendar user interface system 110. Overview calendar-based system user interface 200 displays as an overview general activity levels over an extended (e.g., 5 week) period. Overview calendar user interface 200 may be rendered as a default view, for example, when a user opens or accesses calendar-based interface system 100. It will be appreciated that the extended period of overview calendar user interface 200 may alternatively be of one or more months, or any number of weeks.

Overview calendar user interface 200 provides the user with an abbreviated overview of his or her activity over the extended period encompassing past days, a current day, and future days. The abbreviated overview may include any number of information visualizations relating to events, occurrences, or other information to give the user generalized information that relates to, and can distinguish, different days. In the extended period, for example, one information visualization may assign a distinct font or text color (e.g., bold and italics, as shown for the dates August 12, 13, etc.) to distinguish certain days (e.g., "busy" days) from regular or inactive days. For example, such "busy" days may be identified from metadata stored in calendar system database 104 for each day relating to a combination of calendar appointments and the user's level of computer activity (e.g., amount of keyboard typing compared to an average day, number of files viewed, number of communications, etc.).

Overview calendar user interface 200 may also include a variety of other information visualizations relating to information that is automatically supplied to or acquired by calendar-based interface system 100. The information may relate to user computer activities, unusual or noteworthy events, or the user's geographic location, whether in the past or in the future. The information visualizations give the user generalized information that relates to, and can distinguish, different days.

As examples, image annotations 202, 204, 206, and 208 in the form of small images can be overlaid on calendar days to indicate an event or item on that day, whether in the past or the future. For example, a birthday could be indicated with a small picture 202 of a birthday cake, a payday could be indicated by a monetary symbol 204, or the weather could be indicated with a small icon 206 of a cloud or the sun for current or future weather forecasts or a significant past weather icon 208 could indicate a record hot day as a significant past event. Multiple image annotations could be placed on the same day, and the image annotations could also be composite images of other data. For instance, image annotations 210 could each be a collage of photos that were taken on that day.

Background coloration 212 for one or more days day can be changed to indicate information. For instance, weekends and holidays could be a different color from work days. The hue and intensity of the background coloration 212 can be modulated to provide additional information. For example, days on which a user took more photos could be indicated with a darker blue background coloration 212 than days on which no photos were taken.

Linear annotations or lines 214 that span several days can be added to indicate data that has duration of more than one day. For instance, a vacation could be indicated by drawing a line from the start day to the end day. These lines can very in color and thickness to indicate additional meaning. For example, vacation could be shown in blue and business travel could be shown in red, or the thickness of the line 214 could indicate how active the user was on the computer during those days. A very thin line could indicate low activity while a thick line could indicate high activity.

Text style variations can be used in rendering dates on the calendar. The text variations may include different text size or font face to indicate that the day is different (sample text style variations are indicated in FIG. 2 by bold and italics, for example). For instance, days on which a user had one or more meetings can be shown in bold and italic face. Furthermore, text annotations or descriptions (not shown) could also be added to the calendar, either by themselves or in conjunction with any of the above-mentioned visualizations.

Different annotations may be appropriate for denoting different types of information, but in some instances the use of particular annotations could be based on personal preferences of the user. Additional or more detailed information may be accessed from any annotation via a particularized data search.

Overview calendar-based user interface 200 may be rendered with different amounts of time-related information according to the period of time being displayed. The visualizations included in the multi-week overview shown in FIG. 2 could be less detailed than an overview display for a shorter period of time (e.g., one day or one week). Also, overview calendar-based user interface 200 that relates to the current user context (e.g., what is being searched, what is being viewed currently), as described below in greater detail. For example, if a user is viewing photos, information related to when the photos were taken and shared could be more easily accessible via the overview.

An aspect of the calendar-based user interface of this invention is that it helps users find or retrieve computer information that otherwise can be very difficult to locate with conventional user interfaces. In particular, the calendar-based user interface can help a user conveniently find or retrieve computer objects and information based upon their being related in time automatically. In one implementation, this may be referred to as "navigating by a landmark."

For example, a user might recall that he had sent a picture to another (e.g., to his mother as an instant messaging attachment), but might not recall its filename, when it was taken, where it is stored, etc. In this illustration, "mom" is the landmark. As described below in greater detail, a search through the calendar-based user interface could be directed to "mom," resulting in a listing of "mom-related" computer activities that include instant messages with picture attachments (e.g., indicated directly on the calendar).

Figure 3:
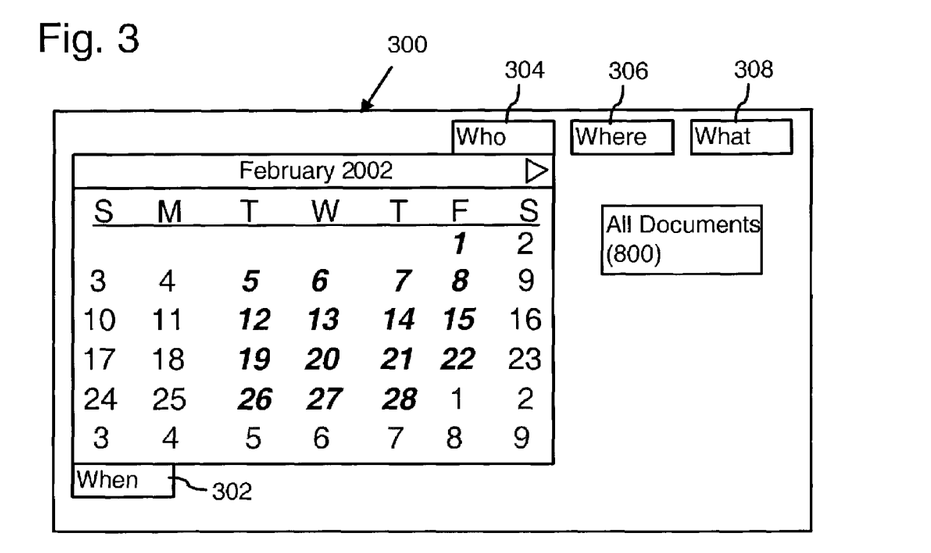
FIG. 3 is an illustration of an exemplary implementation of a "when" tab of a calendar search user interface rendered on a computer display screen.

FIG. 3 is an illustration of an exemplary implementation of a "when" segment or tab 302 of a calendar search user interface 300 rendered on a computer display screen by calendar user interface system 110. Calendar search user interface 300 applies context sensitive metadata relating to the user's current context (e.g., type of computer files being viewed or worked on) to summarize in a calendar view one or more days when events occurred relating to the current context.

As one example, the context could be that the user is viewing photos (i.e., computer files corresponding to photographs) when the user opens or accesses calendar search user interface 300. Based upon the photo-viewing context when it is opened or accessed, calendar search user interface 300 may render "when" tab 302 as a default to show days of a current or default month (or another time period) on which photos were taken or stored. For instance, the days of the month on which photos were taken or stored could be rendered in bold and italics, as illustrated, or with any other distinguishing characteristics, such as a small thumbnail of one of the photos from that day (e.g., a photo of high importance) or the number of photos associated with that day. Accordingly, calendar user interface system 110 determines the particular context of a user and provides information related to that context when calendar search user interface 300 is opened or accessed.

Calendar search user interface 300 further includes a "who" segment or tab 304, a "where" segment or tab 306, and a "what" segment or tab 308. Tabs 304-308 provide user interface affordances for constructing queries analogous to the user interface affordances described above with reference to "when" segment or tab 302.

Figure 4:
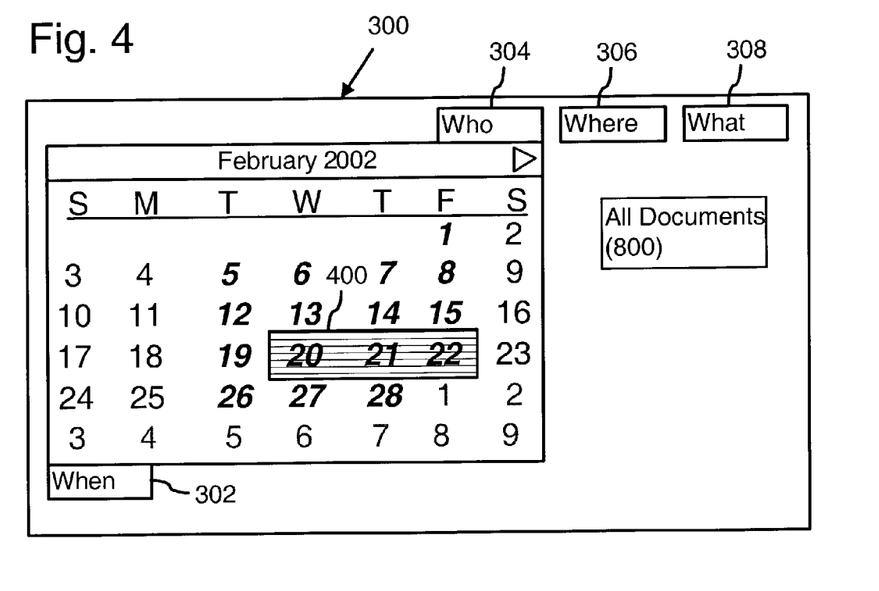
FIG. 4 is an illustration of an exemplary user query having been entered into the "when" tab of a calendar search user interface.

FIG. 4 is an illustration of an exemplary user query 400 having been entered into the "when" segment or tab 302 of calendar search user interface 300. For example, the user can graphically select a day or a date range query 400 that forms the basis for a query a query of calendar system database 104 (FIG. 1). In this illustration, the selected date range 400 corresponds to Feb. 20-22, 2002.

Results from the query (e.g., the photos that were created or stored within that date range) are delivered from calendar system database 104 to chunking system 108, which "chunks" or groups the results. In an exemplary default implementation, chunking system 108 "chunks" or groups the results automatically according to the context or nature of the query (e.g., time or days in the illustrated example). Alternatively, the user may selectively override the default chunking and select another basis for chunking, such as the subject matter in the photos, for example.

Figure 5:
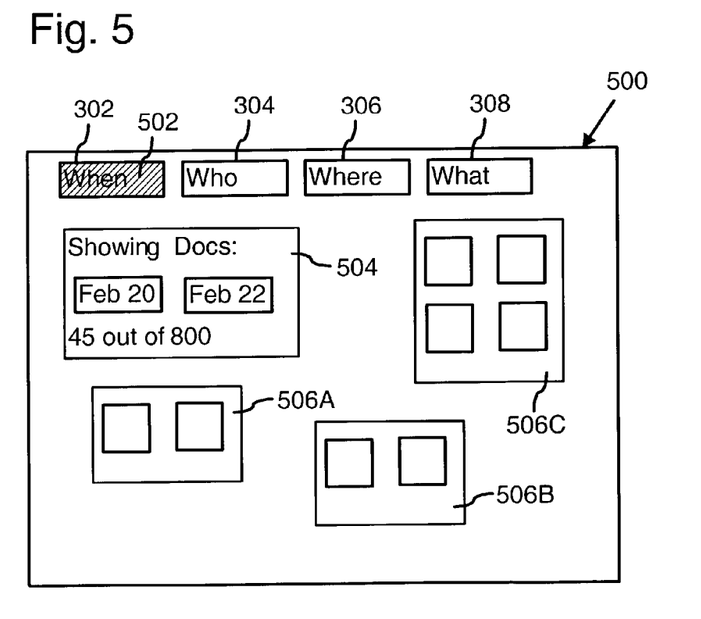
FIG. 5 is an illustration of an exemplary chunked query results display corresponding to the user query of FIG. 4.

FIG. 5 is an illustration of an exemplary chunked query results display 500 corresponding to the user query 400 of FIG. 4. Chunked query results display 500 includes an indication 502 that the query was conducted under the "when" tab 302, together with a query pane 504 indicating the basis of the query (e.g., documents dated between February 20 and February 22) and at least a portion of the results rendered in one or more chunks 506A-506C (e.g., three shown) that correspond to the query. In the photo-based example, chunks 506A-506C may correspond to the respective days February 20, February 21, and February 22 of the query. In addition, each of chunks 506A-506C may include one or more thumbnails 508, or other summarizing visualizations, corresponding to one or more of the higher-importance files assigned to the chunk.

It will be appreciated that the time-based metadata need not be added or entered by the user, but rather is It is created by the system automatically, such as during the file-creation process, or obtained during a file import (e.g., from a camera in the case of a photo). For instance, such a query operation could identify and locate a music file listened to by the user (e.g., last week) without the user having had to do anything beyond listening to the music file.

Figure 6:
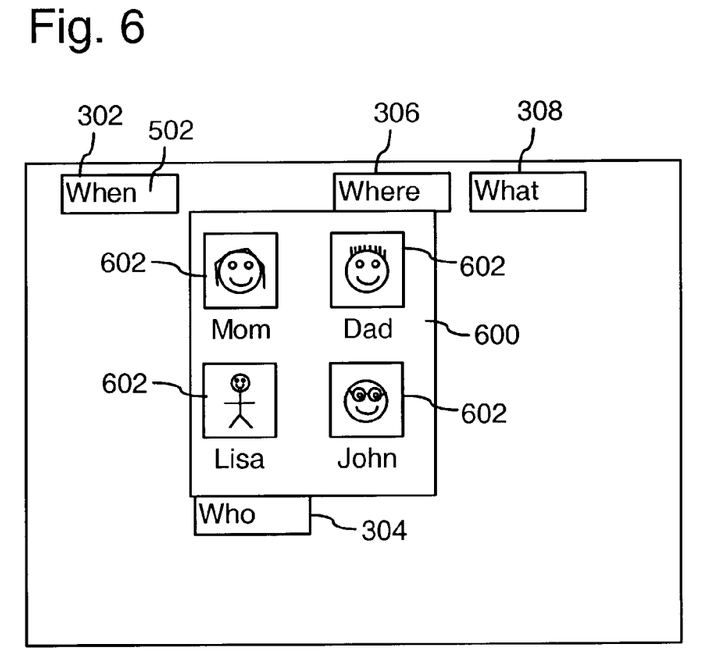
FIG. 6 is an illustration of an exemplary user query having been entered into the "who" tab of a calendar search user interface.

FIG. 6 is an illustration of an exemplary user query 600 having been entered into "who" segment or tab 304 of calendar search user interface 300. With continuing reference to a query relating to photos, a search for photos of a person may be initiated from "who" segment or tab 304, which may include one or more (several shown) thumbnails or other visualizations 602 corresponding to each person who has been identified to calendar user interface system 110. Each thumbnail or visualization 602 may include an identifier for the person and the number of photos or other documents corresponding to the person. For example, the user can graphically select one or more of visualizations 602 to form a query of database 104.

Figure 7:
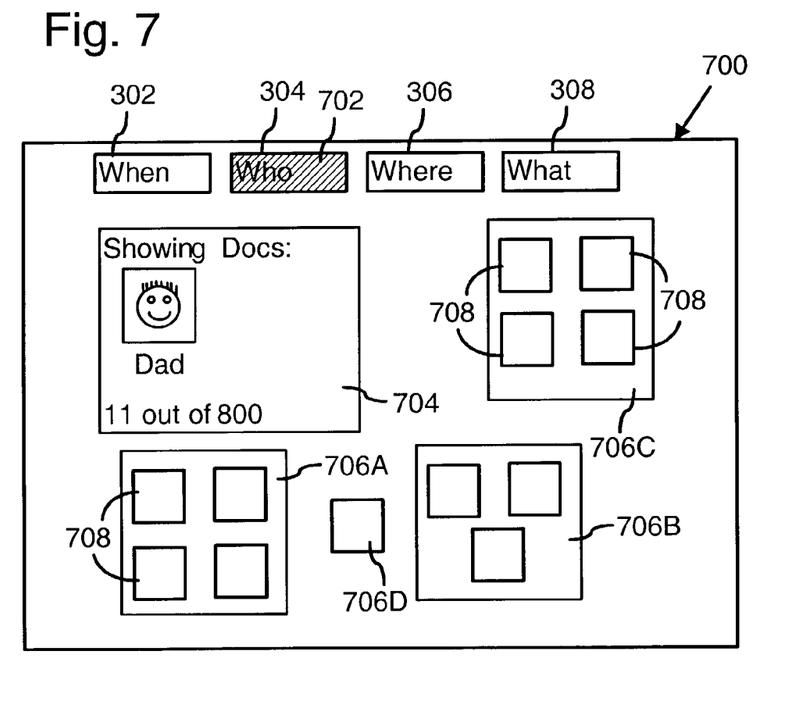
FIG. 7 is an illustration of an exemplary chunked query results display corresponding to the user query of FIG. 6.

FIG. 7 is an illustration of an exemplary chunked query results display 700 corresponding to the user query of FIG. 6. Chunked query results display 700 includes an indication 702 that the query was conducted under the "who" segment or tab 304, together with a query pane 704 indicating the basis of the query (e.g., documents or photos showing Dad) and at least a portion of the results (e.g., all the results) rendered in one or more chunks 706A-706D that correspond to the query. In this example, chunks 706A-706D may correspond to different months in which the photos were created. In addition, each of chunks 706A-706D may include one or more thumbnails 708, or other summarizing visualizations, corresponding to one or more of the higher-importance files assigned to the chunk, or all of the files.

Figure 8:
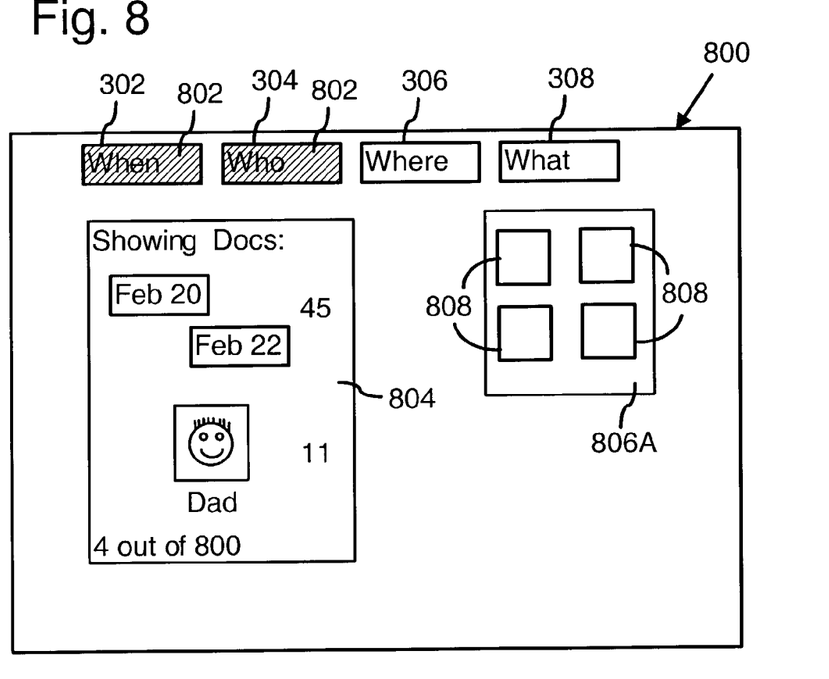
FIG. 8 is an illustration of an exemplary chunked query results display corresponding to a combination of the user queries of FIGS. 4 and 6.

FIG. 8 is an illustration of an exemplary chunked query results display 800 corresponding to a combination of the user queries of FIGS. 4 and 6. As illustrated in FIG. 8, one or more visualization items can be added to query pane 804, such as by a graphical manipulation (e.g., "drag and drop"), to further define a query.

Chunked query results display 800 includes indications 802 that the query was conducted under the "when" tab 302 and the "who" tab 304, together with a query pane 804 indicating the combined basis of the query (e.g., documents or photos dated between February 20 and February 22 and showing Dad) and at least a portion of the results (e.g., all the results) rendered in one or more chunks 806A (one shown). In this example, only chunk 806A is rendered due to the small number (i.e., four) of identified documents or photos. Chunk 806A includes thumbnails 808, or other summarizing visualizations, corresponding to each of the files assigned to the chunk.

Figure 9:
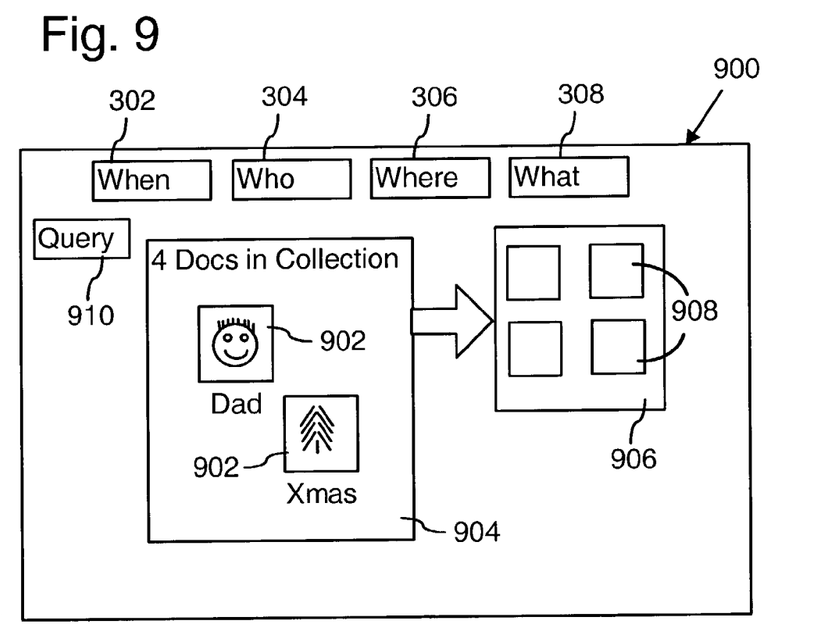
FIG. 9 is a schematic illustration of a metadata viewing interface in which metadata is rendered in a metadata pane for a chunk of items.

FIG. 9 is a schematic illustration of a metadata viewing interface 900 in which metadata tokens 902 (representing metadata) are rendered in a metadata pane 904 for an item or a chunk 906 of items 908. Metadata 902 would typically be accessed through a direct manipulation command, such as hovering with the mouse. The visualization of metadata 902 may be similar to that of the tokens or visualizations from which queries are built. Some metadata 902 can be removed or edited by users (e.g., file names could be edited), whereas other metadata would be fixed (e.g., file size). In the illustration of FIG. 9, chunk 904 includes photos of Dad from Christmas.

It will be appreciated that metadata 902 could be represented or rendered in ways other than metadata pane 904. For example, metadata 902 could alternatively represented as small icons directly on the items, or for instance on the "back" of the items, which could be represented by a user interface action for "flipping" over an item or pulling down a corner of it. In the illustration of FIG. 9, query pane 910 is minimized and inactive once the user starts browsing the metadata 902.

Figure 10:
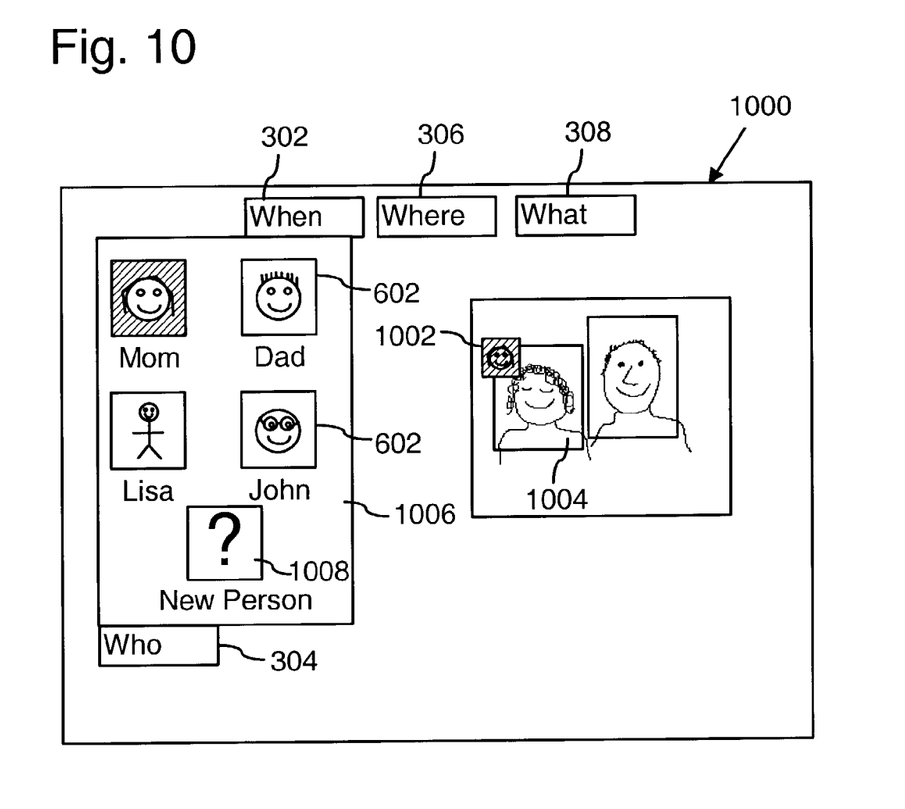
FIG. 10 is a schematic illustration of a metadata tagging interface in which metadata tokens are applied or tagged to files or other items.

FIG. 10 is a schematic illustration of a metadata tagging interface 1000 in which metadata tokens 1002 (one shown) are applied or tagged to files or other items 1004. A metadata token 1002 may be added to or associated with a file 1004 by a graphical "drag and drop" operation in which token 1002 is dragged from a metadata pane 1006 and dropped onto item 1004. A metadata token 1002 that is dropped onto a chunk is added to each item within the chunk.

In one implementation, calendar user interface system 110 can prompt the user to add metadata, with different types of metadata being associated with different file types. For instance, after a user imports photos, calendar user interface system 110 could run a face-detection algorithm over the images and sort them into chunks of different people. It could then prompt the user to provide annotation. In the illustration of FIG. 10, calendar user interface system 110 could identify two faces in the photo, highlight the faces, and brings up the "Who" drawer to let the user annotate them.

For a new person not currently in the system, the user would use or apply a "New Person" token 1008. Once "dropped" on the photo of the new person, "New Person" token 1008 will prompt the user to type a name for the person. The user could of course choose to leave the picture unannotated. In this case, the system would still "know" that there are two people in the picture—it would just not know who they are.

So, it would be returned with a query for "pictures with people in them", but not in a query for "pictures of Lisa". The user could also assign arbitrary keywords to items, by dragging a blank out of the "What" drawer or tab. For instance, the user could annotate a collection of photos as "favorites".

Figure 11:
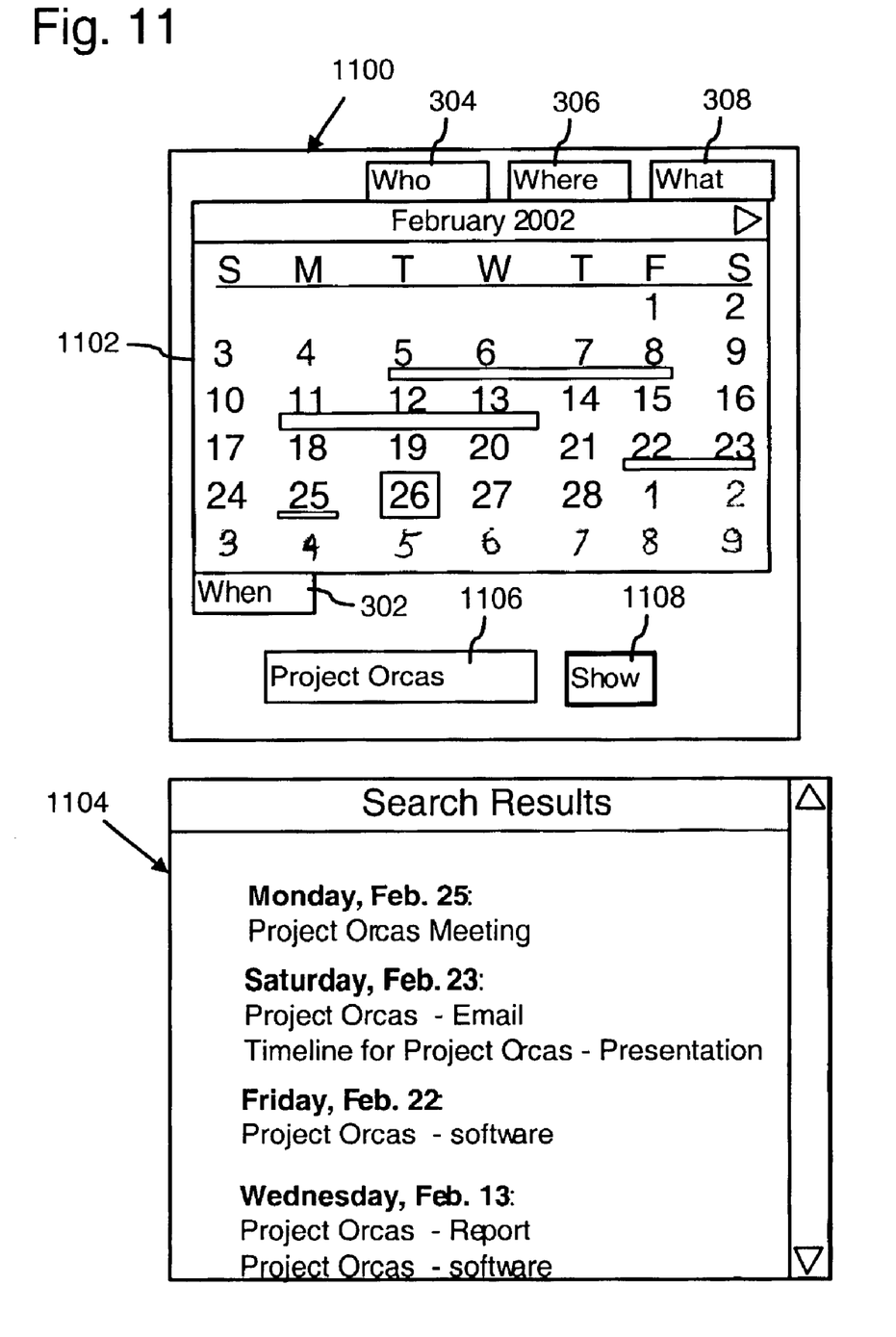
FIG. 11 is an illustration of a "when" segment or tab with an alternative search interface and corresponding overall results and detailed results.

FIG. 11 is an illustration of a "when" segment or tab 302 with an alternative search interface 1100 and corresponding overall results 1102 and detailed results 1104, which could be rendered together simultaneously on a computer display. Search interface 1100 includes a search term window 1106 in which a user enters a search term or phrase, indicated to be "Project Orcas" for purposes of illustration. A search activation control 1108 is graphically activated by the user to initiate a search directed to the search term.

Overall results 1102 indicate in a summary form days on which activities relating to the search term occur, together with indications 1110 indicating the extent or amount of activities on those days. In the illustration of FIG. 11, indications are lines, with thicker lines indicating days with more activities. It will be appreciated, however, that the summary indications could take other forms, such as degrees of shading, different colors, etc. Detailed results 1104 list the identified results specifically for each day the results. Each listing in detailed results 1104 may be activated to open or access the indicated object.

Figure 12:
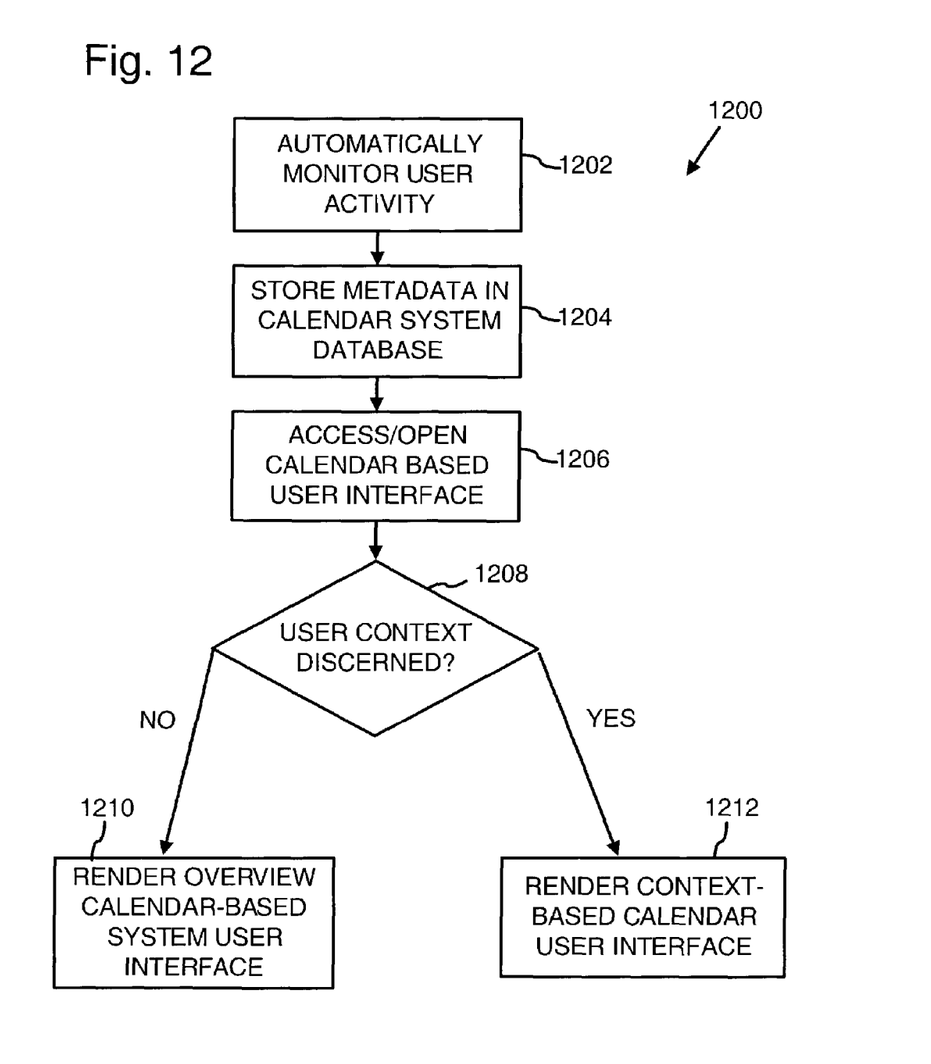
FIG. 12 is a flow diagram of a computer-implemented calendar-based interface method.

FIG. 12 is a flow diagram of a computer-implemented calendar-based interface method 1200 for providing computer users with a calendar-based view of activities and file actions and to use time as a filter of activities and file actions.

Process block 1202 indicates that user activity on a user-operated computer or computing device is monitored automatically. In one implementation, the monitoring of process block 1202 may include universal monitoring of input activity that provides a single entry point for all user interactions with the computer, or at least specified user interactions with the computer.

Process block 1204 indicates that information (e.g., "metadata") about computer files stored on and activities carried out on the computer or computing device are stored in a calendar system database. The metadata may include, for example, any or all of the metadata fields described above with reference to calendar system database 104 (FIG. 1).

Process block 1206 indicates that a calendar-based user interface is accessed or opened, such as by a user input or selection.

Inquiry block 1208 represents an inquiry as to whether a user context may be discerned from the monitored user activity of process block 1202 when the calendar-based user interface is accessed or opened (i.e., process block 1206). A user context could be discerned, for example, if a user is using or interacting with a software application or particular file types when the calendar-based user interface is accessed or opened. A user context could not be discerned, for example, if a user is not using or interacting with a software application or particular file types when the calendar-based user interface is accessed or opened. Inquiry block 1208 proceeds to process block 1210 whenever a user context is not discerned, and otherwise proceeds to process block 1212.

Process block 1210 indicates that an overview calendar-based system user interface (e.g., interface 200) is rendered on a computer display screen with one or more visualizations relating to events, occurrences, or other information to give the user generalized information that relates to, and can distinguish, different days.

Process block 1212 indicates that a context-based calendar user interface (e.g., interface 300) is rendered on a computer display screen based upon the discerned user context.

In accordance with the practices of persons skilled in the art of computer programming, the present invention is described above with reference to acts and symbolic representations of operations that are performed by various computer systems and devices. Such acts and operations are sometimes referred to as being computer-executed and may be associated with the operating system or the application program as appropriate. It will be appreciated that the acts and symbolically represented operations include the manipulation by a CPU of electrical signals representing data bits, which causes a resulting transformation or reduction of the electrical signal representation, and the maintenance of data bits at memory locations in a memory system to thereby reconfigure or otherwise alter the computer system operation, as well as other processing of signals. The memory locations where data bits are maintained are physical locations that have particular electrical, magnetic, or optical properties corresponding to the data bits.

Having described and illustrated the principles of our invention with reference to an illustrated embodiment, it will be recognized that the illustrated embodiment can be modified in arrangement and detail without departing from such principles. In view of the many possible embodiments to which the principles of our invention may be applied, it should be recognized that the detailed embodiments are illustrative only and should not be taken as limiting the scope of our invention. Rather, I claim as my invention all such embodiments as may come within the scope and spirit of the following claims and equivalents thereto.

The invention claimed is:

1. A Calendar-based interface software in a computer readable medium, comprising:
   a calendar system database of metadata relating to objects stored or metadata relating to user activities carried out on a user-operated computer;
   a system activity monitor that monitors system-wide user computer activity on the user-operated computer and automatically stores metadata associated with the monitored user activity in the calendar system database;
   a similarity system that determines a degree of similarity between at least a pair of computer files or objects;
   a chunking system that uses the degrees of similarity determined by the similarity system for a set of objects and groups them into a number of subgroups; and
   a calendar user interface system that utilizes information stored in the calendar system database by the system activity monitor, information determined by the similarity system and the chunking system to display in a calendar format time-based information relating to objects stored or activities carried out on the computer; and
   a metadata tagging interface included with the calendar user interface system comprising one or more metadata tokens generated based on the objects associated with the user activity and displayed on the calendar user interface, the metadata tagging interface is employed by a user to view, search, and assign the one or more metadata tokens to one or more of the objects by a graphical drag and drop operation in which the one or more tokens are dragged from a metadata pane and dropped onto the one or more objects currently being viewed.

2. The software of claim 1 in which the calendar user interface system renders on a display screen an overview calendar-based user interface that includes one or more visualizations relating to user activity on the user-operated computer as determined by the system activity monitor.

3. The software of claim 1 in which the calendar user interface system renders on a display screen an overview calendar-based user interface that includes one or more visualizations relating to information that is automatically stored in the calendar system database without user activity.

4. The software of claim 1 in which the system activity monitor discerns automatically a user context based upon user activity on the computer and in which the calendar user interface system renders on a display screen a context-based calendar user interface based upon the user context.

5. The software of claim 4 further comprising a database query user interface for creating a database query directed to dates associated with metadata stored in the calendar system database, the dates in the database query being selectable directly from a calendar in the context-based calendar user interface.

6. The software of claim 5 in which the database query user interface includes a database query directed to metadata other than dates stored in the calendar system database.

7. The software of claim 4 further comprising a database query user interface for creating a database query directed to metadata other than dates stored in the calendar system database and the system activity monitor includes a universal input activity monitor.

8. The software of claim 1, further comprising a search interface wherein overall results are indicated in a summary form, one or more days on which activities relating to a searched term occur, together with indications representing an extent or amount of activities occurring on the one or more days.

9. Calendar-based interface software in a computer readable medium, comprising:
   a system database of metadata relating to objects stored or user-computer activities carried out on a user-operated computer, the metadata obtained by system-wide monitoring of the activities and including date information that is stored automatically in the database;
   software for a calendar user interface that utilizes information stored in the system database to display in a calendar format time-based information relating to the objects stored or activities carried out on the computer; and
   a metadata tagging interface comprising a metadata pane that automatically generates and displays one or more metadata tokens related to one or more objects associated with the user-computer activities such that a user searches and adds at least one of the metadata tokens to the one or more objects being viewed by a graphical drag and drop operation in which the one or more tokens are dragged from a metadata pane and dropped onto the one or more objects.

10. The software of claim 9 in which the software for a calendar user interface renders on a display screen an overview calendar-based user interface that includes one or more visualizations relating to user activity on the user-operated computer.

11. The software of claim 9 in which the software for a calendar user interface renders on a display screen an overview calendar-based user interface that includes one or more visualizations relating to date information that is automatically stored in the system database.

12. The software of claim 9 further comprising a system activity monitor that monitors user activity on a user-operated computer and discerns automatically a user context based upon user activity on the computer and in which the software for a calendar user interface renders on a display screen a context-based calendar user interface based upon the user context.

13. The software of claim 12 further comprising software for a database query user interface for creating a database query directed to dates associated with metadata stored in the calendar system database, the dates in the database query being selectable directly from a calendar in the context-based calendar user interface.

14. The software of claim 12 in which the software for a database query user interface further provides a database query directed to metadata other than dates stored in the system database.

15. A calendar-based system user interface rendered on a computer display, comprising:
  a user interface calendar that utilizes information associated with system-wide monitoring of user computer activity carried out on a user-operated computer and stored in a system database to display in a calendar format automatically stored time-based information relating to objects stored or activities carried out on the computer; and
  a metadata tagging interface comprising a metadata pane and included with the calendar which permits a user to view, search and assign metadata tokens, generated and rendered in the metadata pane based on the system-wide monitoring of the user computer activity to the objects being currently viewed, by a graphical drag and drop operation in which the one or more tokens are dragged from the metadata pane and dropped onto the one or more objects.

16. The interface of claim 15 in which the user interface calendar includes one or more visualizations rendered on the display screen and relating to the user activity on the user-operated computer.

17. The interface of claim 16 in which the user interface calendar includes one or more visualizations rendered on the display screen and relating to date information that is automatically stored in the system database.

18. The interface of claim 15 in which the user interface calendar includes a context-based calendar user interface corresponding to a user context based upon the user activities carried out on the computer.

19. The interface of claim 18 further comprising a database query user interface for creating a database query directed to date information relating to the computer files stored on or the activities carried out on the user-operated computer, the dates in the database query being selectable directly from the user interface calendar.

* * * * *